United States Patent
Mazzurco et al.

(10) Patent No.: US 7,020,077 B2
(45) Date of Patent: Mar. 28, 2006

(54) CROSS-CONNECT MATRIX TASK PRIORITIZER

(75) Inventors: Anthony Mazzurco, Plano, TX (US); Ramesh Pillutla, Rohnert Park, CA (US); Sanjay Krishna, Plano, TX (US); John K. Blake, Plano, TX (US)

(73) Assignee: Alcatel, Paris (FR)

( * ) Notice: Subject to any disclaimer, the term of this patent is extended or adjusted under 35 U.S.C. 154(b) by 892 days.

(21) Appl. No.: 09/956,423

(22) Filed: Sep. 19, 2001

(65) Prior Publication Data

US 2002/0039360 A1    Apr. 4, 2002

Related U.S. Application Data

(60) Provisional application No. 60/236,868, filed on Sep. 29, 2000.

(51) Int. Cl.
*G01R 31/08* (2006.01)

(52) U.S. Cl. ............... 370/217; 370/225; 370/386; 370/388

(58) Field of Classification Search ........ 370/217–220, 370/225–228, 386, 388
See application file for complete search history.

(56) References Cited

U.S. PATENT DOCUMENTS

| | | | |
|---|---|---|---|
| 4,942,574 A | 7/1990 | Zelle | |
| 4,993,018 A * | 2/1991 | Hajikano et al. | 370/392 |
| 5,130,984 A | 7/1992 | Cisneros | |
| 5,444,693 A | 8/1995 | Arslan et al. | |
| 5,572,679 A * | 11/1996 | Ishizaka et al. | 709/227 |
| 5,663,949 A | 9/1997 | Ishibashi et al. | |
| 5,825,301 A * | 10/1998 | Yoshifuji | 340/2.24 |
| 6,195,186 B1 * | 2/2001 | Asahi | 398/5 |
| 6,335,992 B1 * | 1/2002 | Bala et al. | 385/17 |
| 6,570,873 B1 * | 5/2003 | Isoyama et al. | 370/375 |
| 6,665,495 B1 * | 12/2003 | Aicklen et al. | 398/54 |
| 6,810,038 B1 * | 10/2004 | Isoyama et al. | 370/395.42 |

* cited by examiner

*Primary Examiner*—Chi Pham
*Assistant Examiner*—Rhonda Murphy
(74) *Attorney, Agent, or Firm*—Anderson, Levine & Lintel L.L.P.; Jessica W. Smith; V. Lawrence Sewell

(57) ABSTRACT

A cross-connect switch (12) uses a matrix (40) for providing connection paths. The matrix (40) includes prioritization logic (42) for receiving connection requests from restoration state machines (50) (for changing connections responsive to line conditions) and an administrative processor (for changing connections responsive to operator commands). Connection requests from both the restoration state machines (50) and the administrative processor (52) are cached in FIFO memories (54). When a FIFO memory (54) stores one or more connection requests, the switching control circuitry is notified by a data ready signal. Logic (56) inhibits passing of the data ready signal from the FIFO memory (54) to the switching control (26) until all restoration connection requests have been serviced.

5 Claims, 4 Drawing Sheets

CROSS-CONNECT MATRIX TASK PRIORITIZER

CROSS-REFERENCE TO RELATED APPLICATIONS

This application claims the benefit of the filing date of provisional application U.S. Ser. No. 60/236,868, filed Sep. 29, 2000, now abandoned, entitled "Cross Connect Matrix Task Prioritizer" to Mazzurco et al.

This application is related to U.S. Ser. No. 09/472,534, entitled "Method and Apparatus for Providing Network Protection at Input/Output Interfaces of a Cross-Connect Switch" to Mazzurco et al, filed Dec. 27, 1999.

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to cross-connect matrix.

2. Description of the Related Art

Cross-connect switches are used to provide switching between long haul communication lines. Two different sets of circumstances can result in a cross-connect switch changing the connections between lines. A first set of circumstances, known as "provisioning" takes place responsive to the commands of an operator. Provisioning may include, for example, changes in connections when a new line is introduced to the communications network.

A second set of circumstances is known as "restoration." Restoration is implemented to restore communications after a problem has been detected. For example, communications are generally transmitted over two (or more) redundant lines, a "working" line and a "protect" line. If the working line is cut, a failure in communications is detected and the cross-connect will switch to the protection line.

A change in the connection through a cross-connect switch involves breaking the current connection and creating a new connection. The timing requirements for restoration of a communication line are very strict. Generally, the restoration must occur within a time period on the order of 50 milliseconds. On the other hand, a switch due to provisioning can occur within a time period of a few seconds.

If the cross-connect switch is working in an optical network layer, an interruption due to a single impaired fiber will result in restoration requests from multiple channels. Therefore, the time constraints to create and break connections are even more onerous.

Therefore, a need has arisen for an improved method of servicing connections through a matrix.

BRIEF SUMMARY OF THE INVENTION

In the present invention, a cross-connect switch includes a plurality of input/output ports and a switching matrix. The switching matrix includes a plurality of switching stages, prioritizing circuitry for receiving and prioritizing connection requests for creating or breaking a path though the switching stages, and switching control circuitry for determining a path between two selected ports of the switching stages responsive to the connection requests.

The present invention provides significant advantages over the prior art. First, restoration from multiple restoration state machines can be handled using a single centralized switching control circuitry. All restoration state machines can have equal access to the switching control circuitry. Second, provisioned connection requests can be serviced with the same switching control circuitry used for processing restoration connection requests, while delaying provisioned requests to times where no restoration request is pending.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–7 of the drawings, like numerals being used for like elements of the various drawings.

Figure 1:
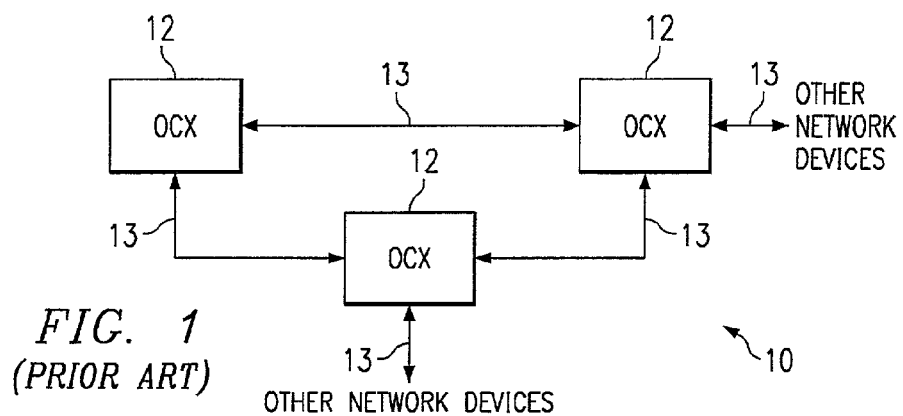
FIG. 1 is a block diagram of the telecommunications system.

FIG. 1 illustrates a very simplified block diagram of a portion of a communication network 10. In this figure, cross-connect switches (shown in FIG. 1 as optical cross-connects or "OCXs" 12) couple communication lines 13 (optical fibers, in this case).

The cross-connect switches 12 provide flexibility in routing lines. As lines 13 are added or removed, connections between lines 13 can be re-provisioned. Also, the cross-connects switches 12 provide the ability to select between two or more redundant channels, in the event that communications over one of the lines is interrupted or degraded.

Figure 2:
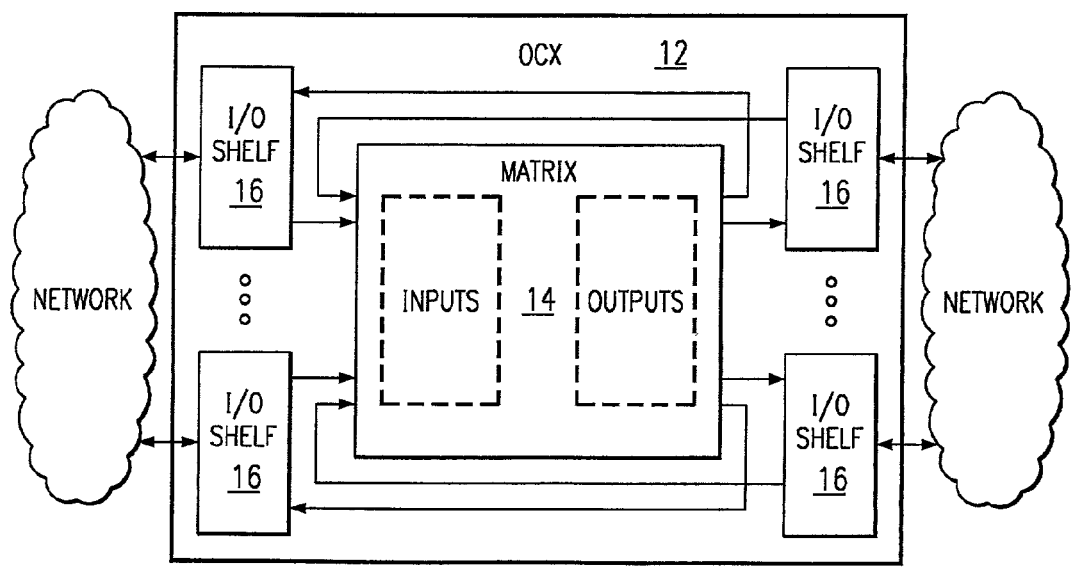
FIG. 2 is a block diagram of a cross-connect switch.

FIG. 2 illustrates a prior art cross-connect switch architecture. A matrix 14 has multiple inputs and multiple outputs. Preferably, the matrix 14 is non-blocking, i.e., matrix 14 has the ability to switch any of the matrix inputs to any of the matrix outputs. The inputs and outputs of the matrix are coupled to a plurality of I/O shelves 16, each shelf providing multiple input/output ports for interfacing with lines 13 from the network 10.

Figure 3:
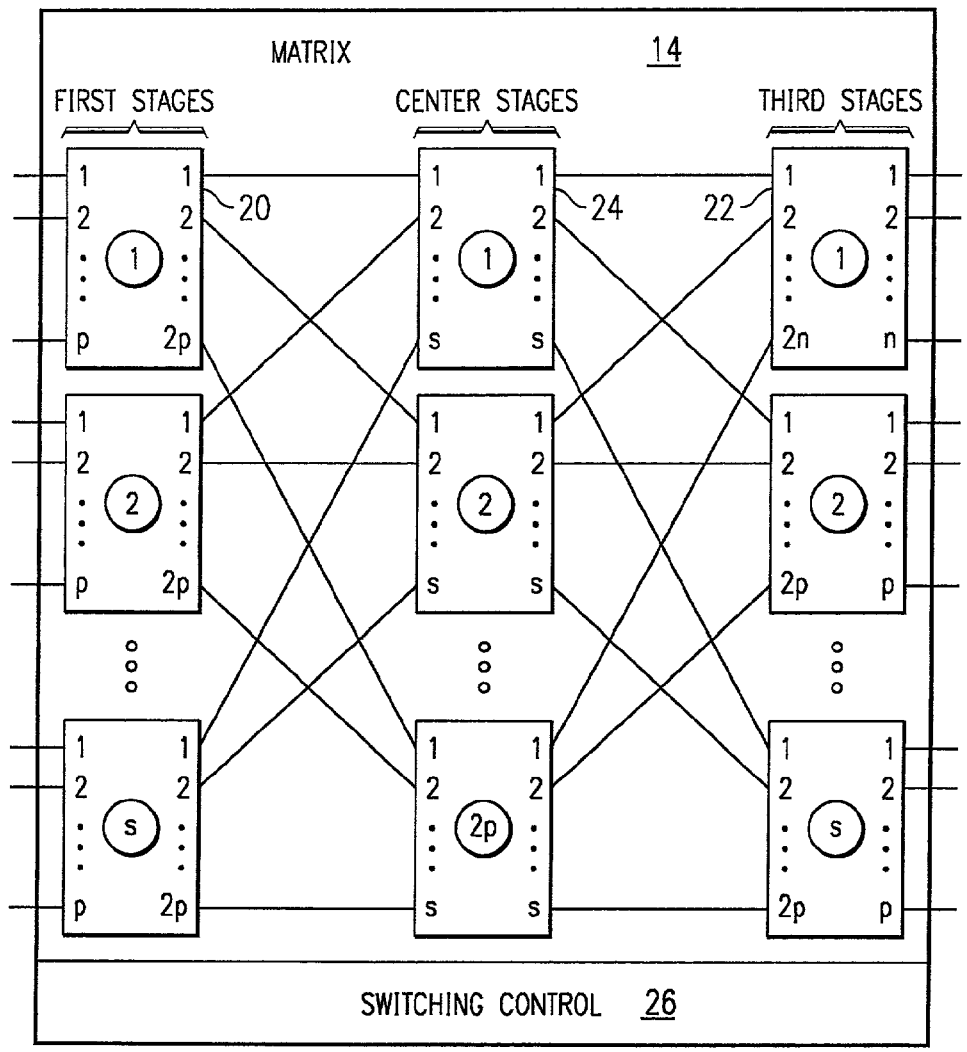
FIG. 3 is a block diagram of a matrix of the cross-connect switch of FIG. 2.

FIG. 3 illustrates a block diagram of a non-blocking matrix 14. The matrix 14 includes s first (originating) stages 20 and s third (terminating) stages 22. Each of the first stages 20 has p inputs and 2p outputs. Each of the third stages 22 has 2p inputs and p outputs. Each first stage 20 provides a two to one expansion, i.e., any of the p inputs of first stage 20 can be connected to any of the 2p outputs of the same first stage 20. Similarly, each third stage 22 provides a two to one compression, i.e., any of the p outputs of a third stage 22 can be connected to any of the 2p inputs of the same third stage 22. Center stages 24 are coupled between the first stages 20 and the third stages 22. There are 2p center stages 24, with each center stage 24 having s inputs and s outputs. The advantage of the architecture shown in FIG. 3 is that it is non-blocking. Regardless of the previously established connections, there will always be a path to connect any of the p*s inputs of matrix 14 to any available output of matrix 14. Switching control 26 uses a connection algorithm for determining the correct path though the stages 20, 22, and 24 based on a requested input port and output port.

U.S. Ser. No. 09/472,534 entitled "Method and Apparatus for Providing Network Protection at Input/Output Interfaces of a Cross-Connect Switch" to Mazzurco et al, filed Dec. 27, 1999, which is incorporated by reference herein, describes a protection scheme where restoration switching is handled at the I/O ports. This reference describes several protection architectures that may be implemented using switching at the I/O ports.

Currently, optical switching stages for matrix 14 are being developed to allow a fully optical cross-connect, i.e., signals transmitted on lines 13 will not be translated to electronic signals as they pass through the optical cross-connect switch 12. Because optical fibers have a communications bandwidth that is much greater than electrical wires, it will be possible to significantly increase the number of channels sent along a single line 13.

Figure 4:
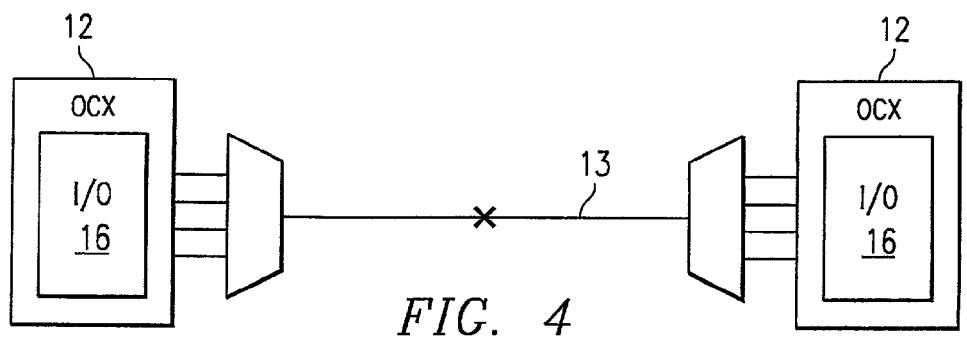
FIG. 4 is a block diagram illustrating a broken connection between cross-connect switches.

With the increased bandwidth, it will be possible, and desirable, to multiplex all the channels from a single cross-connect switch 12 on a single fiber line 13. However, as shown in FIG. 4, a break of the single line 14 would cause loss of both working and protect channels, if both channels originated from the same optical cross-connect. Accordingly, it will be necessary to separate working and protect channels in different cross-connect switches 12.

If the working and protect channels originate from different cross-connect switches 12, it is no longer possible to switch between the two lines in the I/O shelf 16, as described in U.S. patent application Ser. No. 09/472,534. Instead, the switching will need to occur in the matrix 14 of the cross-connect switch 12 coupled to the working and protect channels. An example is shown in FIGS. 5a and 5b.

Figure 5A:
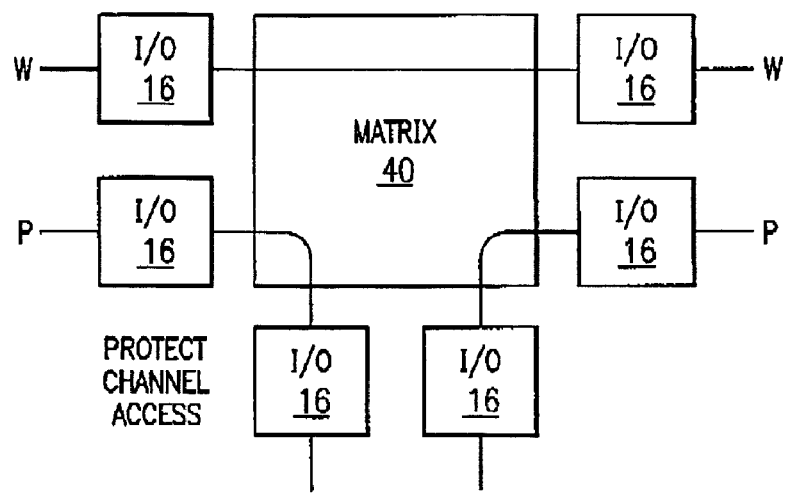
FIGS. 5a and 5b illustrate a protection scheme using the matrix of a cross-connect switch for restoration.
Figure 5B:
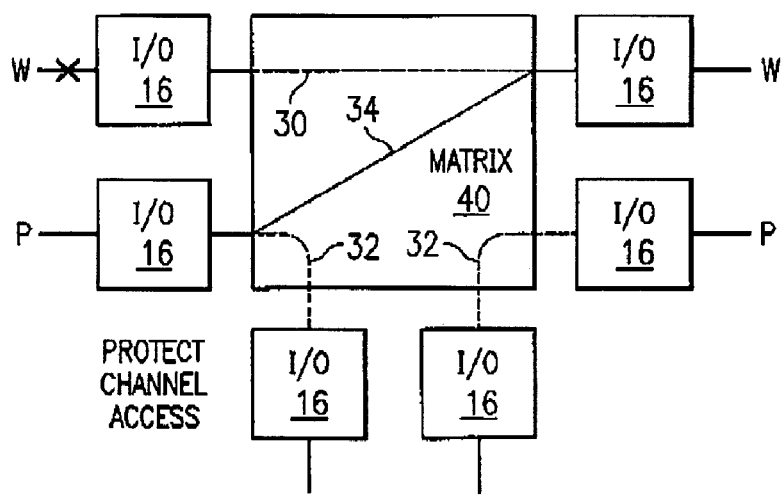

FIGS. 5a and 5b illustrate a cross-connect switch 12 implementing a SONET span switch in a ring configuration (although other configurations could be used). The cross-connect switch 12 uses a matrix 40, described in greater detail in FIGS. 6 and 7, for quickly restoring connections. In FIG. 5a, the ring is operating normally, i.e., the working channels are cross-connected through matrix 40 and the protection channels are servicing low priority (interruptible) access channels.

In FIG. 5b, a failure is shown on the working channel, denoted by an "X". To restore the working channel connection, the existing working channel connection is dropped, as shown by dashed line 30 as are the protect channel access connections shown by dashed lines 32. A new connection 34 is created through the matrix 40, connecting the protect channel input to the working channel output for restoration.

Figure 6:
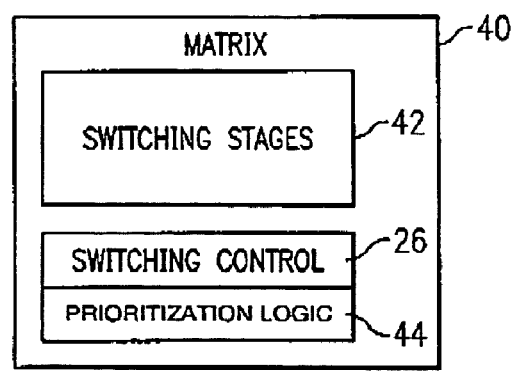
FIG. 6 is a block diagram of a matrix with prioritization logic for providing a protocol for servicing provisioning and restoration connection requests.

FIG. 6 illustrates a block diagram of a matrix 40 which can be used for both restoration and provisioning, while meeting the strict time requirements for restoration. Matrix 40 includes switching stages 42 (such as the three stage architecture using stages 20, 22, and 24 as shown in FIG. 3), switching control 26 and prioritization logic 44.

In operation, the switching control 26 determines a path through the switching stages 42. For the three-stage matrix shown in FIG. 3, the switching control typically receives information on the desired first and third stages and finds a center stage through which a path may be formed. If a single fiber is cut, many channels may be requesting restoration at the same time.

Prioritization logic 44 prioritizes connection requests for the switching control circuit. This prioritization assures that network restoration times are met, while using a single switching control circuit 26 to create and break connections through the switching stages 42. Since a single switching control circuit 26 creates and breaks all paths through the matrix 40, there is no possibility that simultaneous requests for the same first and third stages will result in the selection of the same center stage.

Figure 7:
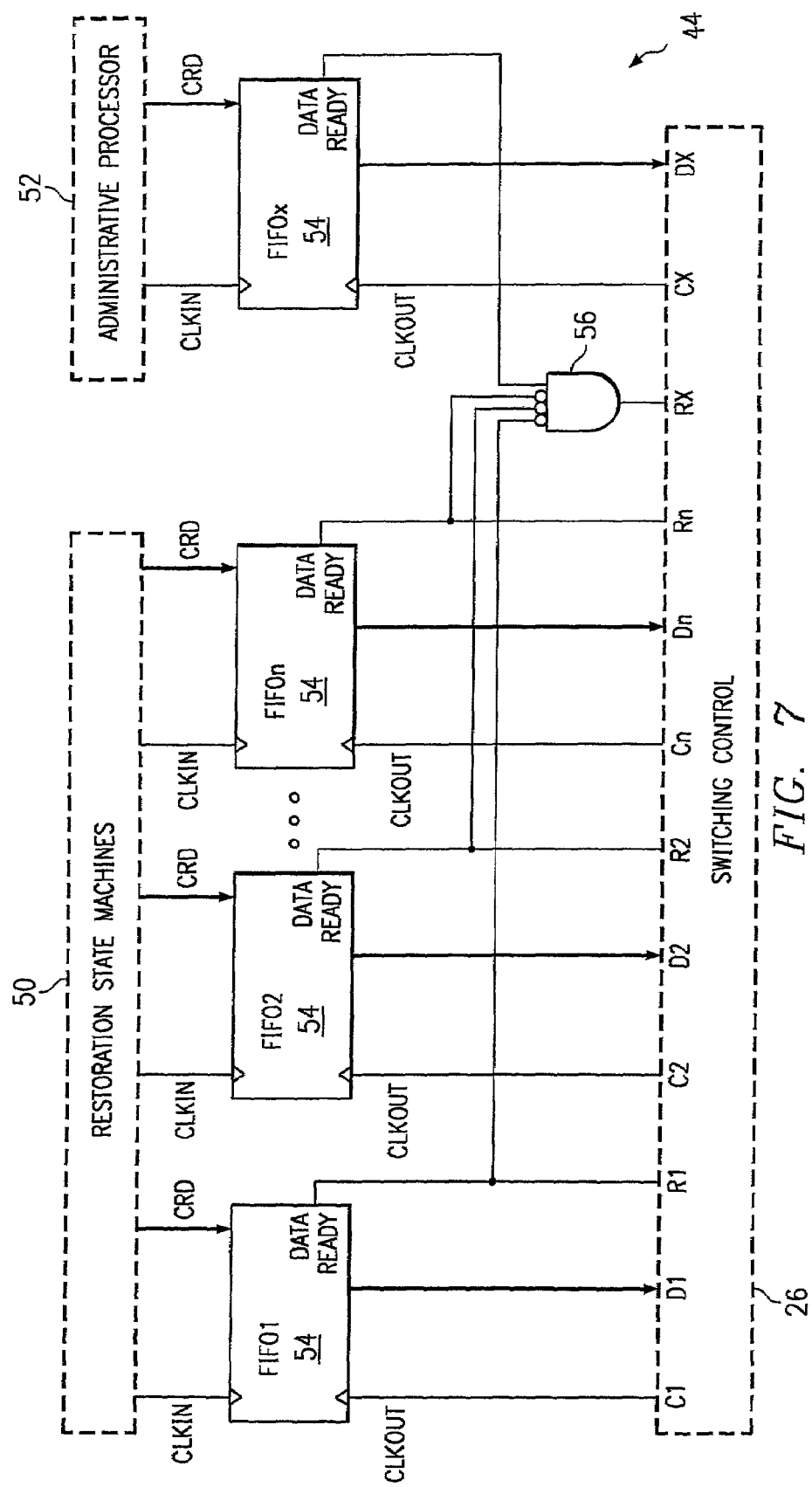
FIG. 7 is a block diagram of the prioritization logic of FIG. 6.

A circuit for implementing the prioritization logic 42 is shown in FIG. 7. Requests for restoration connections come from the restoration state machines 50. One restoration state machine 50 is used for each protection group (a set of lines which can be used to carry redundant data streams). The state machines are connected to the lines in their respective protection groups in the I/O shelves via a local area network (LAN) and continuously monitor the lines in their group for faulty line conditions. Requests for provisioned connections are presented via the administrative processor 52. The administrative process is generally located at the control area of the owner of the cross-connect switch and is connected to the cross-connect switch over a network. In the illustrated embodiment of FIG. 7, there are n restoration state machines 50 and one administrative processor 52. For each restoration state machine 50 there is a FIFO (first in first out) memory 54 for receiving requests. Similarly, a FIFO memory 54 is coupled to the administrative processor 52. Each FIFO memory 54 receives connection request data (CRD) from its associated restoration state machine 50 or administrative processor 52, along with a clock in signal (CLK_IN) when the connection request data is valid at the input of the FIFO memory 54.

FIFO memories 54 are coupled to the switching control circuit 26, which creates and breaks connections in response to connection requests. The switching control circuitry 26 receives the data output of the FIFO memories 54 at data ports D1 . . . Dn (associated with the n restoration state machines 50) and on DX from the administrative processor 52. Data is received at a data port only if the respective FIFO was clocked by the switching control circuitry 26 using clock ports C1 . . . Cn and CX. Each FIFO memory 54 has a data ready output that indicates whether there are connections requests pending in the FIFO memory 54. The data ready outputs associated with the restoration state machines 50 are connected to the switching control circuitry 26 at respective ready port R1 . . . Rn. An n+1 input AND gate 56 has inverting inputs coupled to the data ready outputs of each of the FIFO memories 54 associated with a restoration state machine and also has a non-inverting input coupled to the data ready output of the FIFO memory 54 associated with the administrative processor 52. The output of AND gate 56 is coupled to ready port RX.

In operation, each connection request, either from a restoration state machine or the administrative processor, is stored in the respective FIFO memory 54. When a FIFO memory 54 has a pending connection request, the data ready signal for that FIFO memory is enabled.

Restoration connection requests are serviced as they are received. Ready ports R1 . . . Rn and RX are scanned continuously and, if the signal is enabled (a logical high in the illustrated embodiment) at the ready port as it is scanned, the clock out signal is pulsed to receive the connection request data from the memory. In the preferred embodiment, if a FIFO memory has multiple connection requests, all the requests are serviced prior to scanning the other FIFO memories 54. The ready port associated with the administrative processor can only be enabled if the data ready signal from the associated FIFO is enable and the data ready signal from all of the restoration machines is disabled. Accordingly, provisioning connection requests are serviced only after all restoration connection requests have been completed.

In the preferred embodiment, for a three-stage matrix, connection requests specify the ports first and third stages. By knowing the particular first and third stages from the connection request, the switching control circuitry 26 can assign a center stage based on well-known connection algorithms. In the case of a disconnection, the switching control circuitry 26 accesses an internal database to release the center stage. A single bit may be used to indicate whether the operation is a connection or a disconnection request.

The present invention provides significant advantages over the prior art. First, restoration from multiple restoration state machines can be handled using a single centralized switching control circuitry 26. All n restoration state machines have equal access to the switching control circuitry 26. Second, provisioned connection requests can be serviced with the same switching control circuitry 26 used for processing restoration connection requests, while delaying provisioned requests to times where no restoration request is pending.

While the present invention has been described in connection with a SONET ring protection architecture, it could be used to provide restoration switching with any protection architecture, including those shown in U.S. Ser. No. 09/472,534.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A cross-connect switch comprising:
   a plurality of input/output ports; and
   a switching matrix comprising:
      a plurality of switching stages;
      prioritizing circuitry for receiving and prioritizing connection requests for creating or breaking a path through said switching stages, including circuitry for identifying restoration connection requests and provisioning connection requests; and
      switching control circuitry coupled to said prioritizing circuitry for determining a path between two selected ports of said switching stages responsive to said connection requests,
      wherein said prioritizing circuitry further includes circuitry for inhibiting said switching control circuitry from determining a path responsive to a provisioning connection request if a restoration connection request is pending.

2. The cross-connect switch of claim 1 wherein said prioritization circuitry includes a plurality of first-in first-out (FIFO) memories for receiving connection requests from respective restoration and provisioning sources.

3. The cross-connect switch of claim 2 wherein each of said FIFO memories outputs a control signal indicative of whether a connection request is pending in the FIFO memory.

4. The cross-connect switch of claim 3 and further comprising circuitry for scanning said control signals to determine whether a connection request is pending in any of the FIFO memories associated with a restoration connection request.

5. The cross-connect switch of claim 4 and further comprising circuitry for logically combining said control signals from FIFO memories associated with restoration connection requests and a control signal from a FIFO memory associated with a provisioning connection request to generate a pending provisioning request control signal which is enabled only if the control signal from the memory associated with a provisioning request indicates that a provisioning connection request is pending and if all of the control signals from the FIFO memories associated with the restoration connection requests indicate that there are no restoration connection requests pending.

\* \* \* \* \*